(12) United States Patent
Petrovic et al.

(10) Patent No.: US 8,317,431 B2
(45) Date of Patent: Nov. 27, 2012

(54) CONVEYOR TO TRANSPORT AIR

(75) Inventors: Zmaj Petrovic, Octeville sur Mer (FR); Nicolas Cantisani, Octeville sur Mer (FR)

(73) Assignee: Sidel Preparations, Octeville sur Mer (FR)

( * ) Notice: Subject to any disclaimer, the term of this patent is extended or adjusted under 35 U.S.C. 154(b) by 601 days.

(21) Appl. No.: 11/991,227

(22) PCT Filed: Aug. 8, 2006

(86) PCT No.: PCT/FR2006/001923
§ 371 (c)(1),
(2), (4) Date: Apr. 28, 2008

(87) PCT Pub. No.: WO2007/028869
PCT Pub. Date: Mar. 15, 2007

(65) Prior Publication Data
US 2010/0221075 A1    Sep. 2, 2010

(51) Int. Cl.
*B65G 53/00* (2006.01)
(52) U.S. Cl. ............................ 406/88; 406/191; 406/194
(58) Field of Classification Search .................. 406/88, 406/191, 194; 414/676
See application file for complete search history.

(56) References Cited

U.S. PATENT DOCUMENTS

| | | | | |
|---|---|---|---|---|
| 3,235,099 | A * | 2/1966 | Watters | 414/676 |
| 4,571,150 | A * | 2/1986 | Foster | 414/808 |
| 4,609,001 | A * | 9/1986 | Noh et al. | 134/62 |
| 5,246,314 | A * | 9/1993 | Smith et al. | 406/86 |
| 5,505,292 | A * | 4/1996 | Foster | 198/750.2 |
| 5,704,464 | A * | 1/1998 | Ahls et al. | 198/322 |
| 6,024,518 | A * | 2/2000 | Ouellette | 406/88 |
| 6,033,156 | A * | 3/2000 | Marti Sala | 406/86 |
| 6,332,740 | B1 * | 12/2001 | Bernard et al. | 406/88 |
| 6,494,646 | B1 * | 12/2002 | Sala | 406/88 |
| 6,575,293 | B2 * | 6/2003 | Foster | 198/750.2 |
| 6,612,426 | B1 * | 9/2003 | Guerra et al. | 198/860.2 |
| 6,702,523 | B1 * | 3/2004 | Docheff et al. | 406/197 |
| 6,736,573 | B1 * | 5/2004 | Simkowski | 406/88 |
| 7,326,005 | B1 * | 2/2008 | Castro et al. | 406/192 |
| 7,344,350 | B2 * | 3/2008 | Ikehata et al. | 414/676 |
| 7,481,606 | B2 * | 1/2009 | Lyons et al. | 406/98 |

* cited by examiner

*Primary Examiner* — Joseph A Dillon, Jr.
(74) *Attorney, Agent, or Firm* — The Watson I.P. Group, PLC; Jovan N. Jovanovic; Vladan M. Vasiljevic

(57) ABSTRACT

A pneumatic conveyor which includes a tubular channel (1) defining in its lower part a guidance and propulsion track (2) to transport products. The tubular channel (1) is equipped at regular intervals with a member, which provides guidance and support (6). The pressurized air conduits (4), the electrical wiring (5), and a plurality of covers can be click-locked onto the guidance and support member, which covers the corresponding edges of the tubular channel.

5 Claims, 2 Drawing Sheets

CONVEYOR TO TRANSPORT AIR

The present invention relates to the field of conveying loads by means of pneumatic conveyors or transporters. As its object, the upper part of a pneumatic conveyor or transporter, forms a means of passage for cables and conduits.

Pneumatic conveyors or transporters are generally designed for the movement of relatively light products, guided in a track of said conveyors or transporters, by the action of a flow of pressurized air on said products, at the level of their guidance in the track.

For this purpose, the pneumatic conveyors or transporters are made in the form of a tubular channel defining in its lower part a guide track for the products to be transported. On one hand, said track is provided with pressurized air nozzles at regular intervals in the direction of transport of the products, and on the other hand, under the track with means of maintaining the upper part of the products within said track. Additionally, the tubular channel is supplied with pressurized air by means of corresponding conduits and being provided with means of control in the form of sensors or other devices linked to a central control unit by means of electrical wiring.

Currently, these air conduits and the electrical wiring are disposed in a duct extending above the tubular channel and closed by a cover clipped onto it. For the supply of air to the tubular channel, the air conduits traverse the duct at regular intervals and are connected to said tubular channel. The same is true for the electrical wiring, which traverses the duct in the vicinity of each location which requires installation of a sensor or similar device.

This realization has the disadvantage of being relatively rigid in its conception and implementation, due to the fact that it requires a fairly precise prior consideration of the distribution of pressurized air conduits and electrical wiring, requiring preliminary drilling of holes in the duct and the possible closing of redundant holes by means of plugs.

In addition, any new installation of additional connections or elimination of a conduit or section of wiring automatically requires relatively heavy drilling operations in the corresponding passages or closure of exposed openings, which also has a negative effect on the appearance of these pneumatic conveyors or transporters.

In addition, in these known ducts, the air conduits and electrical wiring are generally disposed at random without any particular guidance, so that operators responsible for maintenance are confronted with a problem of rapid identification of the conduits and wiring which must be repaired.

The present invention has as its object the relief of these disadvantages by proposing a pneumatic conveyor or transporter which allows rapid changes in the connection of pressurized air conduits or electrical wiring, without requiring operations with specific tools or any additional means of closure of any opening.

For this purpose, the pneumatic conveyor or transporter in accordance with the invention is essentially constituted by a tubular channel defining in its lower part a track for the guidance and propulsion of the products to be transported. On one hand, said guidance and propulsion track is provided at regular intervals with pressurized air nozzles in the direction of transport of the products, and on the other hand, on either side of its lower part with means of maintaining the upper part of the products within said guidance and propulsion track. Additionally, said tubular channel is supplied with pressurized air by means of corresponding pressurized air conduits and being provided with means of control in the form of sensors or other devices linked to a central control unit by means of electrical wiring, wherein, on the tubular channel, at regular intervals, a means of guidance and support of pressurized air conduits, electrical wiring, and by covers which can be click-locked onto said means of guidance and support and cover the corresponding edges of the tubular channel, while providing a clearance between said edges and the sides of the cover.

The invention will be better understood from the following description which concerns a preferred realization, given as a non-limiting example, and explained by reference to the attached diagrams, in which.

Figure 1:
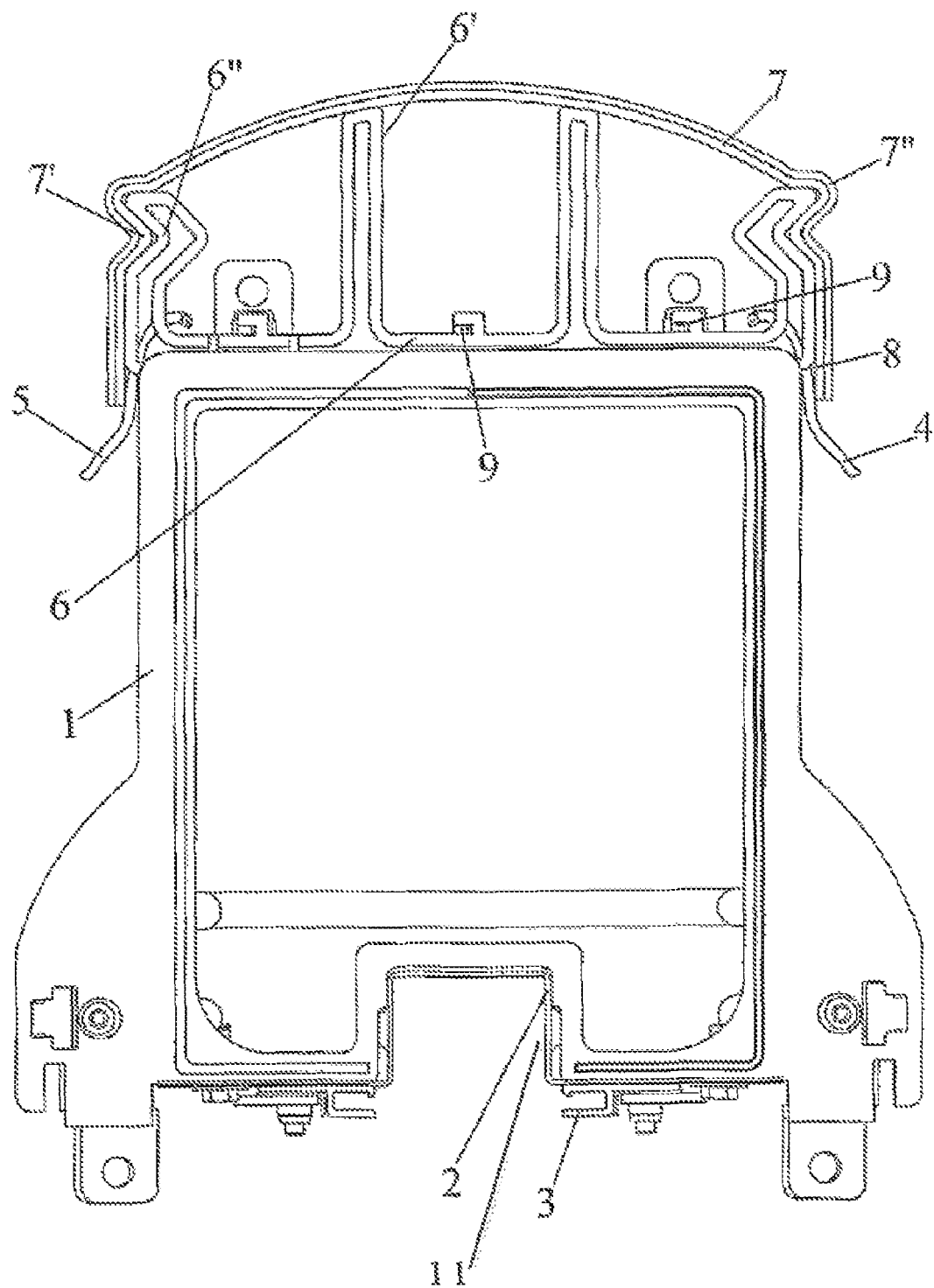
FIG. 1 is a cross-section of a conveyor in accordance with the invention.
Figure 2:
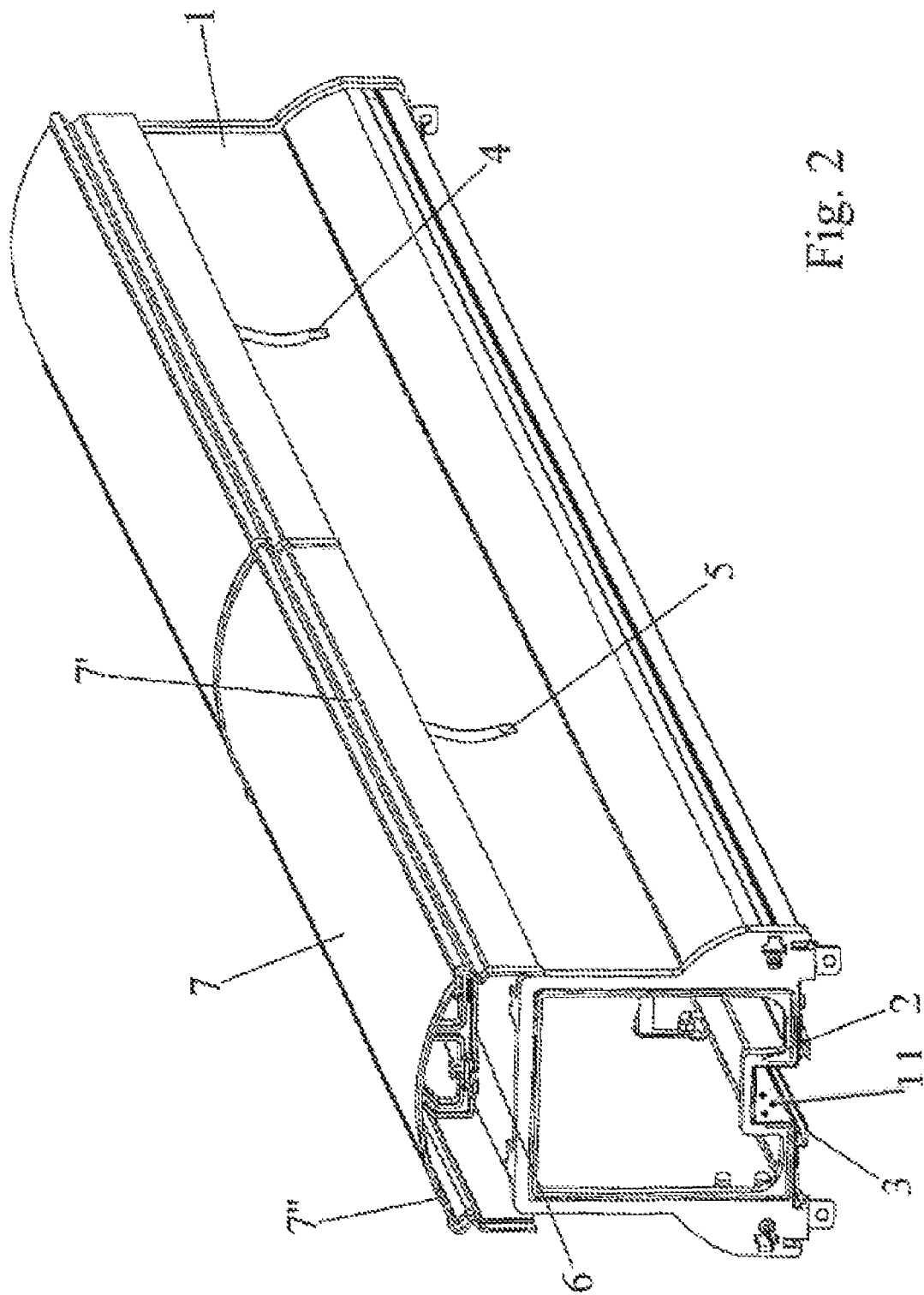
FIG. 2 is a perspective view of a conveyor in accordance with FIG. 1.

FIGS. 1 and 2 of the attached diagrams represent, by way of example, a pneumatic conveyor or transporter which is essentially constituted by a tubular channel 1 defining in its lower part a track 2 for the guidance and propulsion of the products to be transported. On one hand, said guidance and propulsion track 2 is provided with nozzles (11) at regular intervals for the ejection of pressurized air in the direction of transport of the products, and on the other hand, on either side of its lower part with means 3 of maintaining the upper part of the products within said guidance and propulsion track 2. Additionally, said tubular channel 1 is supplied with pressurized air by means of corresponding pressurized air conduits 4 and being provided with means of control in the form of sensors or other devices (not represented) linked to a central control unit by means of electrical wiring 5.

In a known manner, the tubular channel 1 is advantageously realized by an airtight assembly of identical sections. In addition, the functioning of the guidance and propulsion track 2, as well as the support of the products being transported by the means 3 are not described and fall within the usual knowledge of one skilled in the art. In the present case, the pneumatic conveyor or transporter in accordance with the invention is essentially designed to transport bottles toward a bottling unit by guidance of said bottles at the level of their necks, the propulsion by pressurized air being applied equally at the level of the neck, above said guiding device.

In accordance with the invention, this pneumatic conveyor or transporter is provided, on the tubular channel 1, at regular intervals, with a means of guidance and support 6 of the pressurized air conduits 4 and the electrical wiring 5, and with covers 7 which can be click-locked on said means of guidance and support 6 and which cover the corresponding edges of the tubular channel 1 while providing a clearance 8 between the latter and their sides. The clearance 8 defined between the edges of the tubular channel 1 and the sides of each cover 7 is designed to permit the passage of the pressurized air conduits 4 and the electrical wiring 5. Thus, the latter can emerge from the space which is provided for them above the channel 1, at any place determined by the needs of each installation.

The means of guidance and support 6 of the pressurized air conduits 4 and the electrical wiring 5 are advantageously presented in the form of shaped portions of a width greater than the width of the tubular channel 1, these shaped portions being fixed on the upper part of said channel 1 by cooperation with locking elements 9 extending over said upper part of the tubular channel 1 or by being fastened to said upper part by means of screws.

Preferably, the means of guidance and support 6 of the pressurized air conduits 4 and the electrical wiring 5 presents transversally at least one subdivision 6' and its lateral edges present vertical flanges having a cross section which ends in the form of a hook 6" open to the exterior which is designed to cooperate with at least one corresponding locking rib 7' of the corresponding lateral edge of the cover 7.

The means of guidance and support 6 of the pressurized air conduits 4 and the electrical wiring 5 advantageously has a width between the exterior edges of the hooks 6" provided at the end of the vertical flanges of its lateral edges which is equal to the interior width of the covers 7, and the difference between this width and that of the tubular channel 1 is at least equal to twice that of the cross section of a pressurized air conduit 4 or electrical wiring 5.

On one hand, the subdivision 6' provided between the vertical flanges forming the lateral edges of the means of guidance and support 6 of the pressurized air conduits 4 and the electrical wiring 5 assures longitudinal guidance and support of the pressurized air conduits 4 and the electrical wiring 5, and, on the other hand, guarantees, when necessary, longitudinal support for the corresponding cover 7. This avoids any deformation of the cover 7 following inadvertent stress under a load and tension on the upper part of cover 7 between these locking ribs 7', which assures constant support of said cover 7 on the means of guidance and support 6.

The different covers 7 are advantageously provided with cooperating ends, that is, they present an end provided with a bulge 7" designed to cover, when in working position, the adjacent end of the preceding cover, the cross section of which corresponds to the cross section of said cover 7 over the rest of its length. Thus, when the covers 7 are placed, the bulge 7" in one end of each new cover fits over the other end of the preceding cover, thus assuring air tightness at the joint.

The means of guidance and support 6 of the pressurized air conduits 4 and the electrical wiring 5, as well as the covers 7, can be realized in any elastically deformable rigid material obtained by molding, extrusion or other method. The means of guidance and support 6 may, for example, be realized by subsequent cutting of an extruded shaped element, the width of this means 6 being determined by the dimensions of the tubular channel 1 and the covers 7.

The provision of means of guidance and support 6 and of covers 7 greater in width than the width of the tubular channel 1 allows easy guidance of the pressurized air conduits 4 and the electrical wiring 5 to any place outside the duct thus formed, without requiring any drilling of holes in the cover 7. The result is that the installer has great freedom of maneuver, as no point of passage of a pressurized air conduit 4 or electrical wiring 5 is imposed.

In addition, thanks to this possibility of guidance of the pressurized air conduits 4 and the electrical wiring 5 between the sides of the covers 7 and the walls of the tubular channel 1, the appearance of the conveyors or transporters thus realized is also clearly improved, as any drilling becomes unnecessary and, as a corollary, the plugging of unneeded holes is no longer necessary.

Finally, by virtue of the elimination of the small machining operations constituted by the drilling of holes at the time of installation or beforehand, the overhead costs of such a pneumatic conveyor or transporter can be reduced.

Of course, the invention is not limited to the realization described and represented in the attached diagrams. Modifications are possible, particularly from the point of view of the constitution of the various elements or by substitution of equivalent techniques, without thereby departing from the scope of the present invention.

The invention claimed is:

1. A pneumatic conveyor comprising: a tubular channel (1) having edges, defining in its lower part a guidance and propulsion track (2) to transport products, said guidance and propulsion track (2) having nozzles (11) at regular intervals for the ejection of pressurized air in the direction of transport of the products, and on either side of its lower part with means (3) of maintaining the upper part of the products within said guidance and propulsion track (2), said tubular channel (1) being supplied with pressurized air by means of corresponding pressurized air conduits (4), with means of control linked to a central control unit by means of electrical wiring (5), wherein, on the tubular channel (1), at regular intervals, a means of guidance and support (6) of the pressurized air conduits (4), the electrical wiring (5), and a plurality of covers (7) having sides, are click-locked on said means of guidance and support (6) sequentially in an end to end fashion, which cover the corresponding edges of the tubular channel (1), while providing a clearance (8) between said corresponding edges and the sides of the plurality of covers (7), wherein the means of guidance and support (6) of the pressurized air conduits (4) and the electrical wiring (5) include, transversally, at least one subdivision (6') and its lateral edges include vertical flanges having a cross section, having a hook (6") at each end thereof, each end of each hook (6") having exterior edge open to the exterior and designed to cooperate with at least one corresponding locking rib (7') of the corresponding lateral edge of each of the plurality of covers (7).

2. The pneumatic conveyor according to claim 1, wherein the means of guidance and support (6) of the pressurized air conduits (4) and the electrical wiring (5) comprise shaped portions of a width greater than the width of the tubular channel (1), the shaped portions that are fixed on the upper part of said tubular channel (1) cooperate with a plurality of locking elements (9) one of extend over said upper part of the tubular channel (1) or are attached to said upper part.

3. The pneumatic conveyor according to claim 1, wherein the means of guidance and support (6) of the pressurized air conduits (4) and the electrical wiring (5) has a first width between the exterior edges of the hooks (6") at the end of the vertical flanges of its lateral edges, which is equal to an interior width of the cover (7), and the difference between the first width and a width of the tubular channel (1) is at least equal to twice a width of the cross section of either of the pressurized air conduit (4) or the electrical wiring (5).

4. The pneumatic conveyor according to claim 1, wherein the covers (7) are provided with cooperating ends, wherein an end is provided with a bulge (7") designed to cover, when in working position, the adjacent end of the preceding cover.

5. The pneumatic conveyor according to claim 1, wherein the means of guidance and support (6) of the pressurized air conduits (4), the electrical wiring (5), and the covers (7) comprise an elastically deformable rigid material.

* * * * *

UNITED STATES PATENT AND TRADEMARK OFFICE
CERTIFICATE OF CORRECTION

PATENT NO. : 8,317,431 B2  
APPLICATION NO. : 11/991227  
DATED : November 27, 2012  
INVENTOR(S) : Petrovic et al.

Page 1 of 1

It is certified that error appears in the above-identified patent and that said Letters Patent is hereby corrected as shown below:

On the Title Page, Item [73]

Assignee: Sidel Preparations should be

Assignee: Sidel Participations

Signed and Sealed this  
Twenty-fourth Day of December, 2013

Margaret A. Focarino  
*Commissioner for Patents of the United States Patent and Trademark Office*